United States Patent [19]

Niehaus

[11] Patent Number: 5,373,945
[45] Date of Patent: Dec. 20, 1994

[54] CASSETTE FOR STORING SEVERAL DISK-LIKE DATA CARRIERS OR THE LIKE

[75] Inventor: Ralf Niehaus, Bielefeld, Germany

[73] Assignee: HAN-Burogerate GmbH & Co. KG, Herford, Germany

[21] Appl. No.: 168,084

[22] Filed: Dec. 15, 1993

[30] Foreign Application Priority Data

May 3, 1993 [DE] Germany .................. 9306650

[51] Int. Cl.⁵ .................................. B65D 85/57
[52] U.S. Cl. .................. 206/445; 206/444; 206/804
[58] Field of Search ........... 206/44.12, 45, 45.13, 206/45.15, 309, 312, 313, 444, 445, 555, 556, 804, 249

[56] References Cited

U.S. PATENT DOCUMENTS

| | | | |
|---|---|---|---|
| 3,847,274 | 11/1974 | Inglish et al. | 206/804 |
| 4,444,308 | 4/1984 | Macewen | 206/804 |
| 4,527,692 | 7/1985 | Neuman | 206/45.15 |
| 4,676,372 | 6/1987 | Rager | 206/444 |
| 4,684,019 | 8/1987 | Egly | 206/444 |
| 4,759,443 | 7/1988 | Egly | 206/444 |
| 4,776,463 | 10/1988 | Press | 206/444 |

Primary Examiner—Jimmy G. Foster
Attorney, Agent, or Firm—Allegretti & Witcoff, Ltd.

[57] ABSTRACT

The invention pertains to a cassette for storing a plurality of disk-like data carriers with two telescopically insertable, essentially closed, flat housing sections, open in the direction of insertion. The external housing section has attached to one side wall a prod formed as a rib with a stepped edge which projects into the interior of this housing. The steps rise from the bottom of the external housing section towards the open top. The internal housing section which holds the disks has an open top and a slot cut in one side wall and the bottom to receive the rib when the internal housing is nested in the external housing section. The steps on the rib serve to raise successive disks in the interior housing. To close the internal housing, the external housing is inverted and then telescoped with the external housing. The internal housing section, on the side opposite the slot, has a recess open towards the top of the internal housing section 1 which receives the rib in closed position.

10 Claims, 4 Drawing Sheets

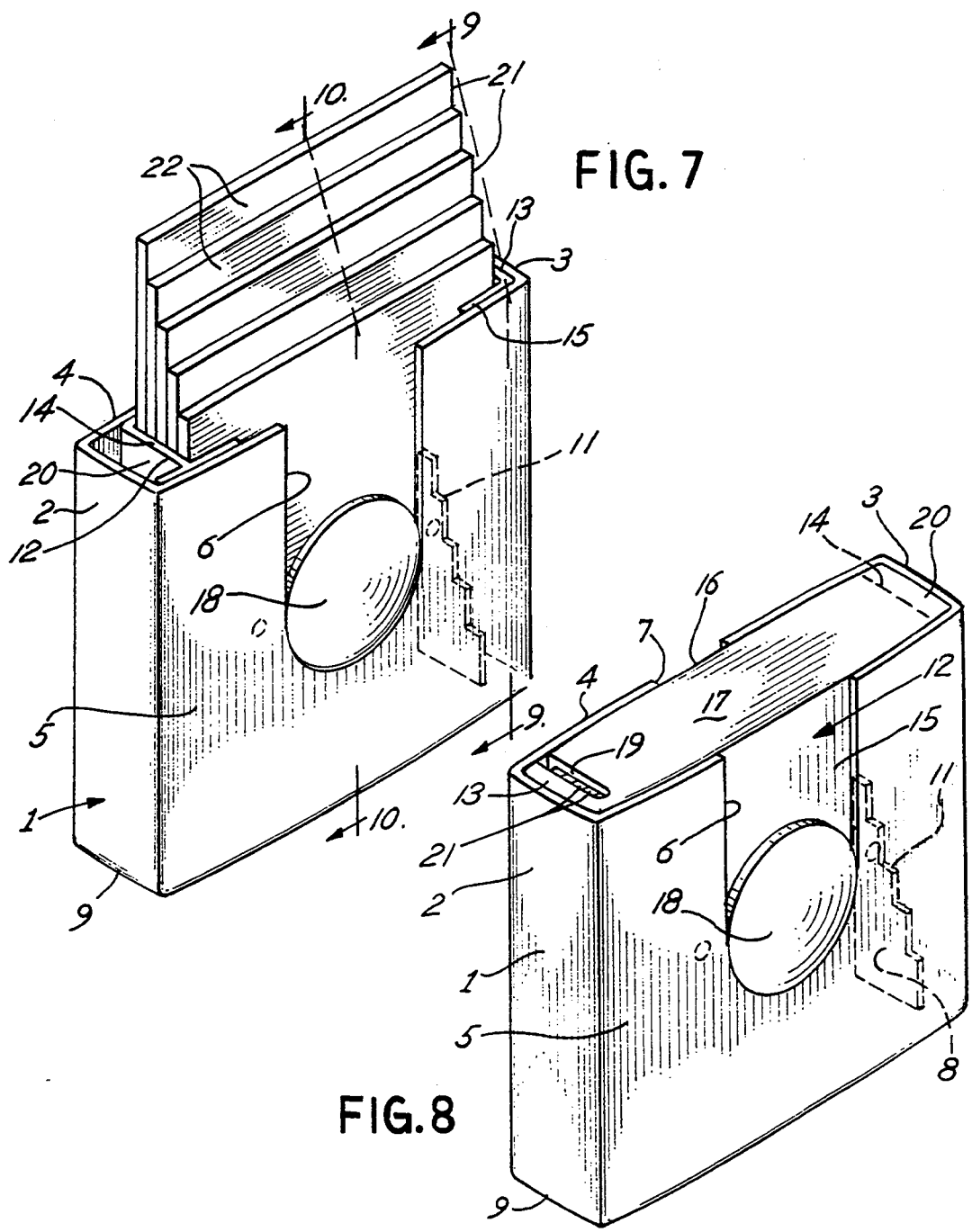

FIG.9
FIG.10
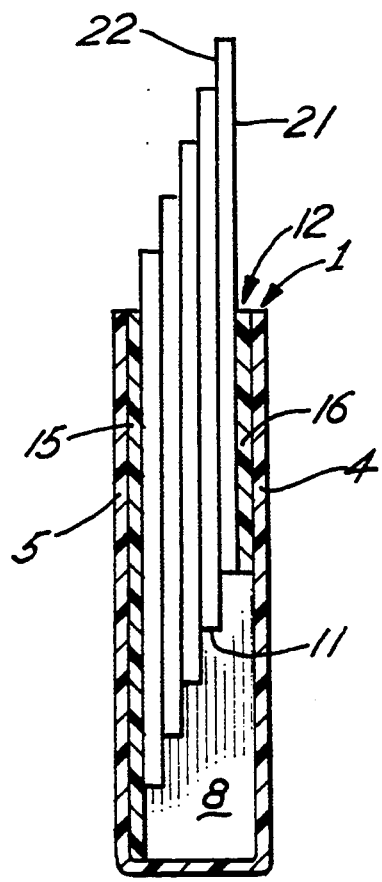
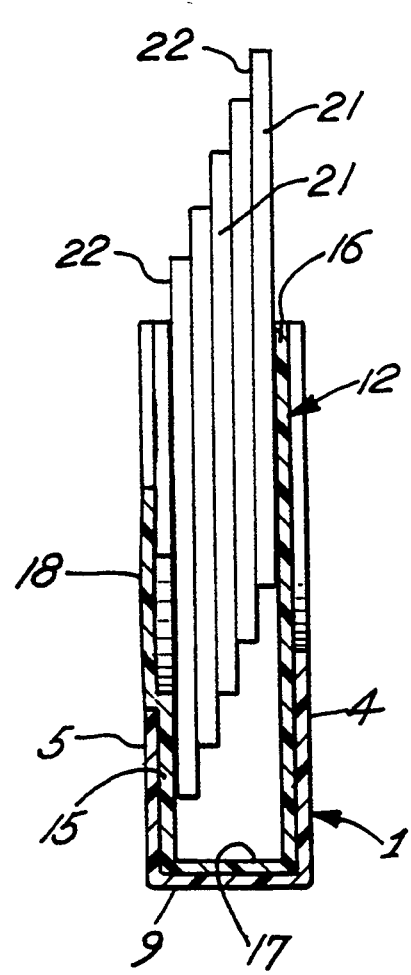

CASSETTE FOR STORING SEVERAL DISK-LIKE DATA CARRIERS OR THE LIKE

BACKGROUND OF THE INVENTION

The invention pertains to a cassette for storing several disk-like data carriers or similar elements, e.g. diskettes for computers.

Such cassettes are generally known. The disk-like data carriers are stacked inside the cassette in parallel with each other to form a packet. When the cassette is opened, the disk-like data carriers must be removed either individually or all together in order to be able to read any writing or other identification present on the flat surfaces of the data carriers. This is cumbersome and time-consuming. Furthermore, after removing one, several, or all of the data carriers, they are returned into the cassette out of order. This makes reading the identification and locating a particular disk difficult the next time. Although it is possible to assemble individual data carriers somewhat in order, this requires great dexterity.

THE INVENTION

It is the object of ion to provide a cassette for storing a plurality of disk-like data carriers, e.g. diskettes, in which the disadvantages of the known cassettes are obviated, in which the reading of writing on the flat surfaces is simplified and maintenance of the order of the data carriers is improved.

In accordance with the invention, a staggered partial removal of the disk-like data carriers from an internal housing section is possible after opening the cassette. By pushing successive disks out of the housing section at different heights, the identification on each becomes visible simultaneously to facilitate removal of the desired disk. The cassette of the invention also facilitates proper placement of the disks within the housing. Staggered removal is accomplished by providing access to the bottom of said disks through a slot in the internal housing which holds the disks. A prod having a stepped edge is inserted through the slot. The individual steps of the prod abut the bottom edges of each successive data carrier in such a way that they rise in a staggered manner through the open top of the internal housing section, so that the labeled surface sections at the top of each data carrier become visible. The writing must be located in these exposed areas of the data carriers which is usually the case and which is also easy to accomplish.

In accordance with the invention, the stepped-edge prod is not provided as a separate component, but is disposed inside an external housing section which telescopes with the inner housing section. The external housing section is open at one end and when it is pushed from the bottom onto the internal housing section, the stepped edge of the prod enters the recess of the internal housing section so that the individual data carriers are engaged by the steps and are raised in a step-like manner.

The prod must not impede the closing of the cassette which is accomplished by sliding the external housing section, upside down, over the open end of the internal housing section so that the open end is covered by the bottom of the external housing. For this purpose, a recess is provided outside an end wall of the internal housing section. This is the end facing away from the slot for the stepped-edge prod. If the two housing sections are telescopically pushed into each other in the correct position for closing, that is, with the stepped-edge prod disposed at the end of the internal housing section opposite the prod-receiving slot, then the stepped edge prod does not push against the data carriers in the internal housing section, but rather enters the recess outside the housing. Thus, the prod does not interfere with the telescoping action. In closed position, the prod lies adjacent and outside one end wall of the internal housing section. The distance between the two end walls of the internal housing section corresponds to the width dimension of the data carriers to be stored therein.

Preferably, the external housing section, in the storage position with the cassette closed, as well as in the display position, completely encloses the internal housing section. However, it is sufficient for purposes of the invention that the internal housing section be only partially enclosed.

A slot or slots can be provided in one side wall or both side walls of the external housing section, said slots facilitating gripping of the internal housing section when nested within the external housing section.

One side wall of the internal housing section can be provided with an external boss adapted to slide into said slot or only in one of said slots; thus the two housing sections can be inserted into each other only when they are properly oriented.

The two housing sections Furthermore can be provided with associated engaging means to engage both housing sections when inserted into each other.

THE DRAWINGS

By means of the drawings, the invention will be explained in greater detail with the aid of an example.

FIG. 7 is a front perspective view of the two housing sections telescopically engaged with open ends up, showing the individual data carriers in the internal housing section pushed out to expose areas for written identification on the outer ends of the carriers.

FIG. 8 is a front perspective view of the two housing sections in closed or storage position, showing the internal housing section inserted open top first into said external housing section to enclose the data carriers.

FIG. 9 is a cross section, taken along 9—9 of FIG. 7, similar to FIGS. 2 and 5, through the two housing halves telescopically inserted and individual data carriers in the internal housing pushed out to expose areas for written identification on the outer ends of the carriers.

FIG. 10 is a cross section taken along 10—10 of FIG. 7.

DETAILED DESCRIPTION

Figure 1:
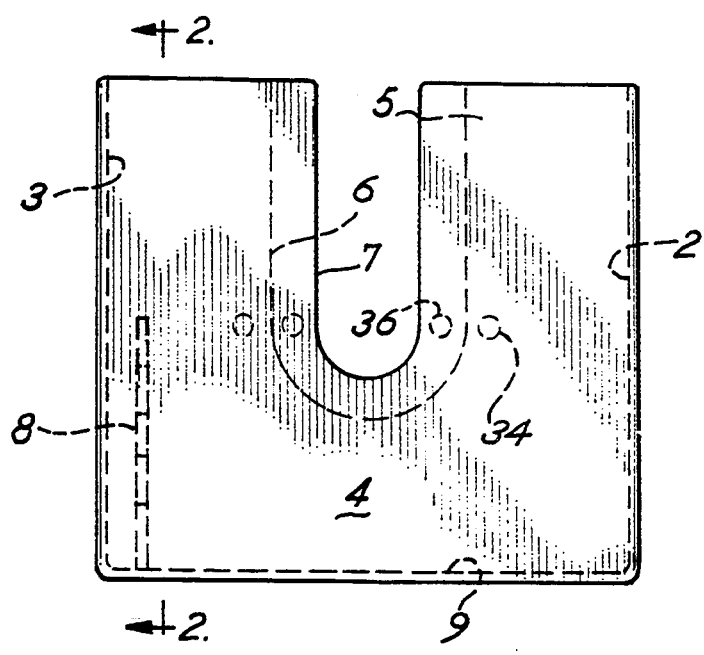
FIG. 1 is a rear elevational view of an external housing section of a cassette in accordance with the invention.

The external housing section 1 shown in FIGS. 1–3, 7, 8 and 10 has end walls 2 and 3, side walls 4 and 5, and a bottom wall 9. U-shaped slots 6 and 7 are centrally located in walls 5 and 4, respectively, for gripping the internal housing section when the sections are nested. Slot 6 also serves to receive a boss on internal housing section 12 when inserted in housing 1, as described below. Housing 1 is open at the top. Slot 7 is smaller than slot 6 so that the sections can be telescoped only when properly oriented.

A prod in the form of a rib 8 is attached to the wall 4 slightly spaced from the end wall 3 and extends into the interior of the housing section 1. The rib 8 abuts bottom 9 of the housing section. The rib 8 has a stepped edge 11 which extends up to approximately half the height of the housing section 1 and narrows from the bottom to the top. A gap 10 is formed between the riser of the lower step of rib 8 and the wall 5 into which a wall of internal housing section 12 can enter when the sections are telescoped. The steps provide staggered supports for a series of disk-like elements stored in housing 12 as described below.

Figure 2:
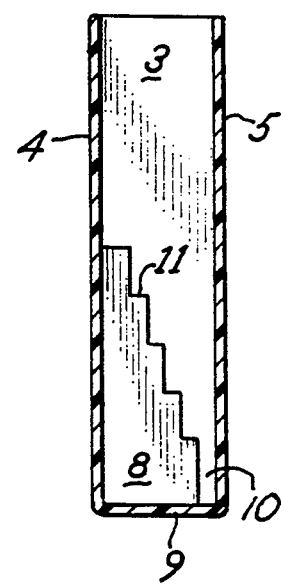
FIG. 2 is a cross section taken along line 2—2 of FIG. 1.
Figure 3:
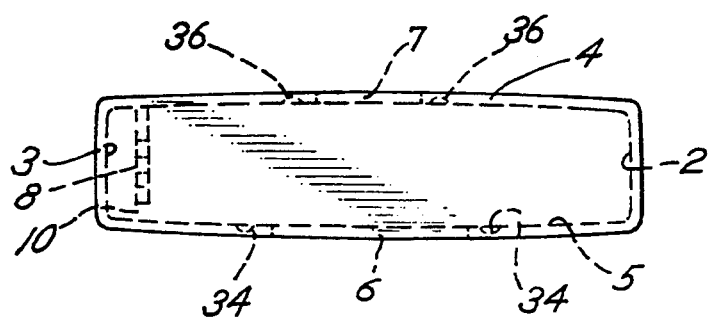
FIG. 3 is a view from the open top of the housing section in accordance with FIG. 1.
Figure 4:
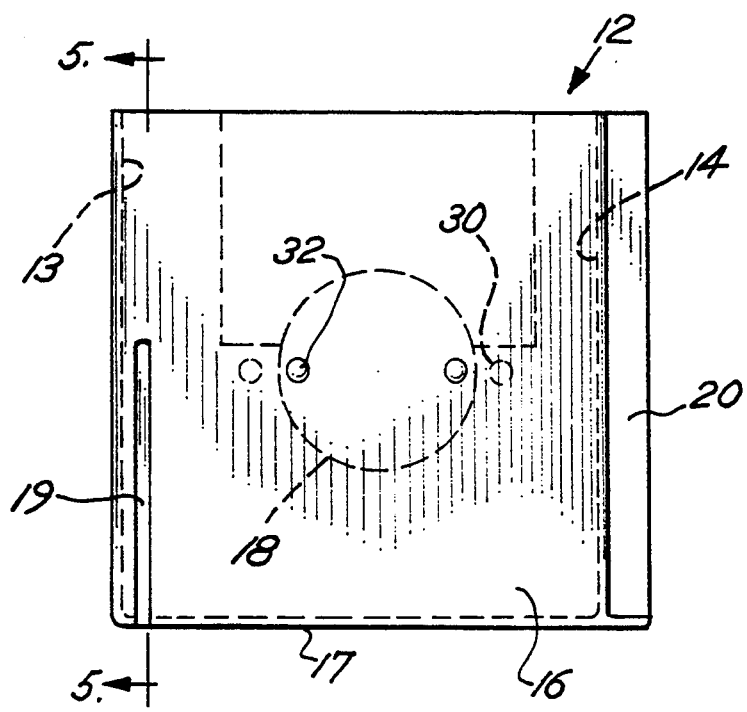
FIG. 4 is a rear elevational view of the internal housing section of the cassette.
Figure 5:
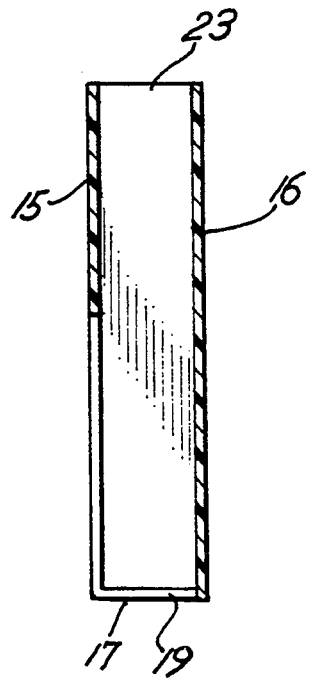
FIG. 5 is a cross section taken along line 5—5 of FIG. 4.
Figure 6:
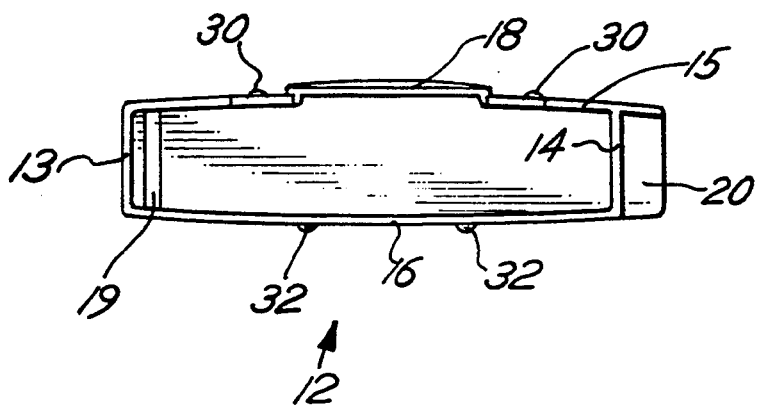
FIG. 6 is a view from the open top of the internal housing section in accordance with FIG. 4.

FIGS. 4–6 show, in views corresponding to FIGS. 1–3, an internal housing section 12 with end walls 13 and 14, side walls 15 and 16, and a bottom 17, dimensioned to telescope inside section 1; see also FIGS. 7, 8 and 10. The housing section 12 is open at the top 23 to receive disk-like elements, or diskettes, 21 which carry data for use with computers. Commercial diskettes are 3-½ inches or 5 inches square. The distance between the walls 13 and 14 is slightly larger than the width of disks to be stored. A projection, or boss, 18, which in the top view is round, extends from the center of wall 15. As shown in FIGS. 7 and 8, when the housing sections 1 and 12 are pushed into each other, boss 18 slides into the slot 6 in wall 5. Boss 18 is larger than the slot 7 in wall 4 so that the section will not telescope if section 12 is backwards. Thus, the two housing sections 1 and 12 can be inserted into each other only when they are properly oriented. Slots 6 and 7 permit gripping the internal housing to remove it from the external housing.

A narrow slot 19 is cut in the wall 16 of internal housing section 12 up to approximately half the wall height and continues in bottom 17, as shown in FIG. 5. The slot is wide enough to receive the prod or rib 8 of the housing section 1. Also, the distance of the slot 19 from the end wall 13 is dimensioned in accordance with the distance of the rib 8 from the end wall 3 of the housing section 1 so that during telescoping of the two housing sections with the open tops in the same direction, for the purpose of individually displaying disk-like data carriers arranged in the cassette, the rib can enter the slot 19 in an unhindered manner. When oriented in this fashion, the sections nest.

As best shown in FIGS. 4, 5 and 7, a recess or opening 20 is formed by an extension of the side wall 15, and of the bottom 17. The recess is open at the top and adjacent the face of end wall 14. This recess 20 is dimensioned in such a way that, in the storage or closed position (FIG. 8) in which the housing section 1 is turned upside down to close the open end of housing 12, and the housings are telescopically pushed into each other, the rib 8 may enter freely the recess 20. In closed position, external housing 1 encloses recess 20, except at the top.

In the storage position, shown in FIG. 8, the two housing sections 1 and 12 are pushed into each other with their openings facing each other, so that a stack of disk-like data carriers 21 may be held in the interior housing section 12 between the end walls 13 and 14 and side walls 15 and 16. In order to determine which disk-like data carriers are located in the cassette, the external housing section 1 is pulled off in the upward direction from the housing section 12, is rotated in the same plane by 180°, so that the open top of the housing section 1 points upward. Then the interior housing section 12, in the same position, i.e., with the opening 23 towards the top and the bottom 17 first, is pushed into the exterior housing section 1. The inserted position is shown in FIGS. 7, 9 and 10 in which disk-like data carriers 21 arranged inside the cassette are shown for a better understanding of the mode of operation of the cassette of the invention. It can be seen that the rib or prod 8 has penetrated the interior of the housing section 12 through slot 19 and the steps of the stepped edge 11 of the rib 8 have pushed against the lower edges of the data carriers 21 and arranged them in a step-like manner in the upward direction. Nested in this way, the writing surfaces 22 and the identification of each data carrier 21 are visible.

When the cassette is to be closed again, the internal housing is manually gripped at boss 18 and the area of side wall 16 surrounded by slot 7. The external housing section is pulled off the internal housing section 12 in the downward direction so that the data carriers 21 completely sink back into the internal housing section 12. Subsequently, the external housing section 1 is turned by 180° in the same plane and, with the opening facing down, is pushed onto the internal housing section 12. The rib 8 then reenters the recess 20 and the bottom 9 covers the open end 23 of housing 12.

Rounded buttons or protuberances 30, 32 may be provided on the external surfaces of walls 15 and 16, which buttons slide into dimples 34, 36 in the internal surfaces of walls 5 and 4 to prevent the internal housing from sliding out of the external housing until manual force is applied.

I claim:

1. A cassette for storing a plurality of disk-shaped elements comprising
   a generally flat rectangular external housing section having a bottom, end walls, side walls, and an open top;
   a rib inside said external housing attached to one side wall of said housing and having a stepped edge extending into said housing,
       said rib being spaced from one end wall of said housing to provide a gap, said rib narrowing toward said open top;
   an internal housing section for holding said disk-shaped elements having a bottom, end walls, side walls, and an open top, the external dimensions of which are smaller than the corresponding dimensions of said outer housing section, to permit telescoping and nesting said internal housing section bottom first with said outer housing section; and
   a slot cut through one side wall and the bottom of said internal housing section to admit said rib when the internal housing section is inserted in said outer housing section,
   whereby said stepped edge of said rib extends into the interior of said internal housing section to lift disk-shaped elements in said internal housing section on the steps of said stepped edge.

2. The cassette of claim 1 in which said internal housing section has a recess outside said end wall opposite the end wall adjacent said slot, said recess being open toward said open top for receiving said rib when said internal housing section is inserted open top first into said external housing section to close said internal housing section.

3. The cassette of claim 1 in which said rib is parallel to said end wall from which is it spaced.

4. The cassette of claim 2 in which said external housing section completely encloses said internal housing section.

5. The cassette of claim 1 in which one side wall of said external housing section has a first central U-shaped slot open to said open top and the corresponding wall of said internal housing section has an external boss which slides into said slot when the internal and external housing sections are nested.

6. The cassette of claim 5 in which said external housing has a second U-shaped slot in the side wall opposite said first central U-shaped slot, said second U-shaped slot being narrower than said external boss.

7. The cassette of claim 1 which includes a button like protuberance on the external surface of a side wall of said internal housing section and a cooperating dimple in the internal surface of a side wall of said external housing section which receives said protuberance when said housing sections are telescoped together.

8. The cassette of claim 2 in which said rib is attached to said bottom of said outer housing section and the edge of said lower most step is spaced from the side wall opposite said one side wall to which said rib is attached to accommodate a side wall of said internal housing section when said internal housing section is completely nested with said external housing section.

9. The cassette of claim 1 in which said rib extends from the bottom of said outer housing section to about half way up the wall to which it is attached, and said stepped edge has a series of steps rising from said bottom to the top of said rib, each successive step being closer to the wall to which said rib is attached than is the step below.

10. A cassette for storing a plurality of disk-shaped elements comprising a generally rectangular external housing section having a bottom, end walls, side walls, and an open top, a thin elongated rib attached to one side wall of said housing, and extending from the bottom of said housing part way up said one side wall toward said open top, the edge of said rib opposite said one side wall being formed to provide a series of steps rising from the bottom to the top of said rib, a generally rectangular internal housing section for holding said disk-shaped elements, dimensioned to slide into and nest with said outer housing section, and a slot cut into said internal housing section to accommodate said rib when said outer and inner housing sections are nested so that said rib extends into the interior of said inner housing section.

* * * * *